(12) United States Patent
Lauwers et al.

(10) Patent No.: US 9,961,835 B2
(45) Date of Patent: May 8, 2018

(54) MULTIPLE TENT COVER UNLOAD CONTROL SYSTEM

(71) Applicant: CNH America LLC, New Holland, PA (US)

(72) Inventors: Andrew V. Lauwers, Stevens, PA (US); Kevin W. Ward, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 395 days.

(21) Appl. No.: 14/098,502

(22) Filed: Dec. 5, 2013

(65) Prior Publication Data
US 2015/0156968 A1 Jun. 11, 2015

(51) Int. Cl.
| A01D 41/127 | (2006.01) |
|---|---|
| A01D 41/12 | (2006.01) |
| A01F 12/60 | (2006.01) |
| A01D 57/00 | (2006.01) |
| A01D 61/00 | (2006.01) |
| A01D 69/00 | (2006.01) |

(52) U.S. Cl.
CPC ......... *A01D 57/00* (2013.01); *A01D 41/1208* (2013.01); *A01D 41/1217* (2013.01); *A01D 61/004* (2013.01); *A01D 69/00* (2013.01); *A01F 12/60* (2013.01)

(58) Field of Classification Search
CPC . A01F 12/60; A01D 41/1208; A01D 41/1217; A01D 41/1273
USPC .............. 56/10.2 R; 414/526, 519, 114, 6, 1; 198/860.3, 860.5; 460/1
See application file for complete search history.

(56) References Cited

U.S. PATENT DOCUMENTS

| 2,412,121 | A |   | 12/1946 | Bradshaw |   |
|---|---|---|---|---|---|
| 2,601,608 | A |   | 6/1952 | Hansen |   |
| RE24,920 | E |   | 1/1961 | Palmer |   |
| 3,204,754 | A |   | 9/1965 | Wenning |   |
| 3,240,366 | A |   | 3/1966 | Sahr |   |
| 3,265,227 | A |   | 8/1966 | Vratil et al. |   |
| 3,279,592 | A | * | 10/1966 | Kerkvliet | B65G 33/34 119/57.2 |
| 3,669,291 | A | * | 6/1972 | De Coene | A01F 12/16 198/625 |
| 3,841,536 | A |   | 10/1974 | Maiste et al. |   |
| 5,584,640 | A |   | 12/1996 | Johnson |   |

(Continued)

FOREIGN PATENT DOCUMENTS

| JP | 2001161157 | 6/2001 |
|---|---|---|
| JP | 2003250331 | 9/2003 |

*Primary Examiner* — John Weiss
(74) *Attorney, Agent, or Firm* — Peter K. Zacharias; Patrick M. Sheldrake

(57) ABSTRACT

A combine unload control system having a grain tank for storing grain and at least one auger for unloading grain from the grain tank. The control system also includes a first auger cover proximate to the at least one auger, having one or more first auger cutouts disposed on a portion of the first auger cover and a second auger cover proximate to the at least one auger and having one or more second auger cutouts disposed on a portion of the second auger cover. The control system further includes a controller configured to control amounts of grain to pass through the one or more first auger cutouts and the one or more second auger cutouts and flow to the at least one auger by causing the first auger cover and the second auger cover to move relative to each other.

8 Claims, 11 Drawing Sheets

(56) References Cited

U.S. PATENT DOCUMENTS

| | | |
|---|---|---|
| 6,042,326 A | 3/2000 | Thomas et al. |
| 6,776,569 B1 | 8/2004 | McMahon et al. |
| 7,452,180 B2 | 11/2008 | Talbi et al. |
| 7,862,286 B2 | 1/2011 | Mackin et al. |
| 7,874,899 B2 | 1/2011 | Mackin et al. |
| 2009/0290970 A1 | 11/2009 | O'Neill et al. |
| 2013/0158813 A1 | 6/2013 | McCully et al. |
| 2013/0280019 A1* | 10/2013 | Dekoning ............... B60P 1/42 414/526 |

* cited by examiner

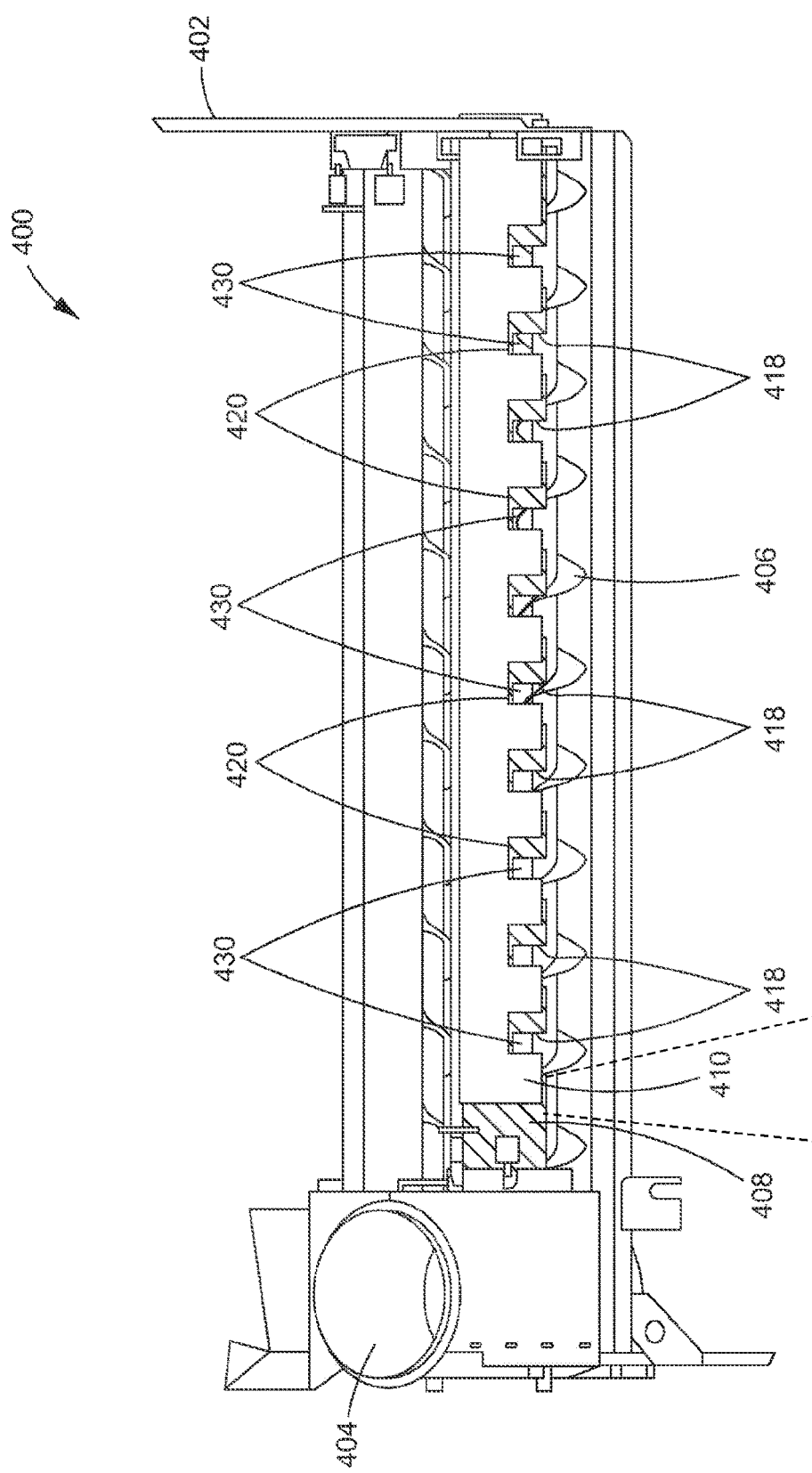

MULTIPLE TENT COVER UNLOAD CONTROL SYSTEM

TECHNOLOGY FIELD

The present subject matter relates generally to harvesters, such as combine harvesters, and more particularly to methods and systems to control an unload drive system during unloading.

BACKGROUND

A combine harvester is a machine that is used to harvest grain crops. The objective is to complete several processes, which traditionally were distinct, in one pass of the machine over a particular part of the field. Among the grain crops that may be harvested with a combine are wheat, oats, rye, barley, corn, soybeans, flax or linseed, and others. The waste (e.g., material other than grain (MOG)) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the MOG through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material (i.e., MOG) are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located in an upper portion of the combine and loaded via a conveyer that carries clean grain collected in the cleaning system to the grain tank.

Conventional unload systems include grain tanks arranged such that grain conveyed from the cleaning system fills the tanks and is gravity-fed into one or more cross augers. By virtue of gravity feed and the cross augers, grain may be distributed to one or more areas in the grain tank, such that another conveying system can unload the grain from the grain tank. Because the typical grain tank is small compared to the size of the harvest, grain that collects temporarily in the grain tank may, in some harvests, be conveyed or unloaded to a support trailer, truck, or grain cart alongside the combine.

Some conventional unload systems include a single cost effective drive system to manage loads. The most severe of these loads is typically incurred during system start up, when the unload system is full or partially full of grain. Other conventional unload systems include more complicated dual or staged drive systems to manage high torque requirements of increased unload rates that exceed capabilities of single drive systems, including the higher load requirements incurred during system start up.

SUMMARY

Embodiments include a combine unload control system having a grain tank for storing grain and at least one auger for unloading grain from the grain tank. The control system also includes a first auger cover proximate to the at least one auger, having one or more first auger cutouts disposed on a portion of the first auger cover and a second auger cover proximate to the at least one auger and having one or more second auger cutouts disposed on a portion of the second auger cover. The control system further includes a controller configured to control amounts of grain to pass through the one or more first auger cutouts and the one or more second auger cutouts and flow to the at least one auger by causing the first auger cover and the second auger cover to move relative to each other.

According to one embodiment, the one or more first auger cutouts and the one or more second auger cutouts are configured to provide common openings for the grain to pass through and the common openings change in size when the first auger cover and the second auger cover to move relative to each other.

According to another embodiment, the second auger cover is located between the at least one auger and the first auger cover and the common openings are provided when portions of the one or more second auger cutouts are overlaid upon portions of the one or more first auger cutouts.

In one embodiment, the first auger cover is positioned between the at least one auger and the second auger cover and the second auger cover moves while the first auger cover remains stationary.

In another embodiment, the first auger cover is positioned between the at least one auger and the second auger cover and the first auger cover moves while the second auger cover remains stationary.

According to one embodiment, the geometries of the one or more first auger cutouts and the geometries of the one or more second auger cutouts are substantially the same.

According to another embodiment, the geometries of the one or more first auger cutouts are different than the geometries of the one or more second auger cutouts.

In one embodiment, a vertical opening extends between ends of the first and second auger covers and an auger bed to provide a pathway for the grain to pass through and flow to the at least one auger and the cutouts are disposed on the ends of the first and second auger covers such that the common openings are configured to increase the size of the pathway for the grain to pass through.

In another embodiment, the system further includes at least one sensor for sensing at least one operating condition of a combine system. The controller is further configured to automatically control the amounts of grain to pass through the one or more first auger cutouts and the one or more second auger cutouts based on the sensed conditions.

According to an aspect of an embodiment, the at least one sensor is from a group of sensors that includes: (i) an unload drive system sensor for sensing a condition of the unload drive system; (ii) a separator system engaging sensor for sensing if a separator system is engaged; (iii) a feeder system engaging sensor for sensing if the feeder system is engaged; (iv) operational system speed sensors for sensing respective operational speeds of at least one of a combine engine, a combine drive system, the combine feeder system, a combine crop-handling system, a combine threshing system, a combine cleaning system and a combine residue system; (v) crop flow sensors for sensing respective crop rates moving through at least one of the combine feeder system, the combine crop-handling system, the combine threshing system, the combine cleaning system and the combine residue system; and (vi) a feeder system position sensor for sensing a position of a feeder mechanism relative to a portion of a combine frame.

According to another aspect of an embodiment, the at least one operating condition sensed by the at least one sensor is from a group of operating conditions that includes: (i) whether a force on the unload drive system has reached a predetermined force threshold value; (ii) whether the combine separator system is activated, the combine separator system comprising at least one of the combine feeder system, the combine crop-handling system, the combine threshing system, the combine cleaning system and the combine residue system; (iii) whether the feeder system is activated independent from the separator system; (iv) whether an operational system speed has reached a predetermined speed threshold value in at least one of the combine drive system, the combine feeder system, the combine crop-handling system, the combine threshing system, the combine cleaning system and the combine residue system; (v) whether an operational system speed of a combine system has reached a predetermined speed threshold value for a predetermined amount of time in at least one of the combine feeder system, the combine crop-handling system, the combine threshing system, the combine cleaning system and the combine residue system; (vi) whether a rate of crop flow has reached a predetermined threshold value in at least one of the combine feeder system, the combine crop-handling system, the combine threshing system, the combine cleaning system and the combine residue system; and (vii) whether a position of a feeder mechanism of the combine feeder system has reached a predetermined threshold position, wherein the position of the feeder mechanism includes an angle of the feeder mechanism relative to a combine frame.

According to one embodiment, the controller is further configured to (i) receive an input via a user interface to control the movement of the first auger cover and the second auger cover relative to each other; and (ii) control the first auger cover and the second auger cover to move relative to each other responsive to the received input.

Embodiments include a combine unload system having a grain tank for storing grain and at least one auger for unloading grain from the grain tank. The system also includes a first auger cover proximate to the at least one auger, having one or more first auger cutouts disposed on a portion of the first auger cover and a second auger cover proximate to the at least one auger and having one or more second auger cutouts disposed on a portion of the second auger cover. The first auger cover and the second auger cover are configured to move relative to each other and cause amounts of grain to pass through the one or more first auger cutouts and the one or more second auger cutouts and flow to the at least one auger.

According to one embodiment, the one or more first auger cutouts and the one or more second auger cutouts are configured to provide common openings for the grain to pass through and flow to the at least one auger and the common openings change in size when the first auger cover and the second auger cover to move relative to each other.

According to another embodiment, the second auger cover is located between the at least one auger and the first auger cover and the common openings are provided when portions of the one or more second auger cutouts are overlaid upon portions of the one or more first auger cutouts.

In one embodiment, the first auger cover is positioned between the at least one auger and the second auger cover and the second auger cover is configured to move while the first auger cover remains stationary.

In another embodiment, the first auger cover is positioned between the at least one auger and the second auger cover and the first auger cover is configured to move while the second auger cover remains stationary.

According to one embodiment, the system further includes one or more actuation devices configured to move the first auger cover and the second auger cover relative to each other and a user interface configured to receive inputs from an operator. The actuation device (i) moves the first auger cover and the second auger cover to move relative to each other responsive to one or more of the received inputs.

According to another embodiment, a vertical opening extends between ends of the first and second auger covers and a bottom of the grain tank to provide a pathway for the grain to pass through and flow to the at least one auger and the cutouts are disposed on the ends of the first and second auger covers such that the common openings are configured to increase the size of the pathway for the grain to pass through and flow to the at least one auger.

Embodiments include a method of controlling amounts of grain unloaded from a combine. The method includes storing grain in a grain tank and unloading grain from the grain tank using at least one auger. The method also includes providing a first auger cover having one or more first auger cutouts proximate to the at least one auger and providing a second auger cover having one or more second auger cutouts proximate to the at least one auger. The method further includes controlling amounts of grain to pass through the one or more first auger cutouts and the one or more second auger cutouts and flow to the at least one auger by causing the first auger cover and the second auger cover to move relative to each other.

Additional features and advantages of the disclosed subject matter will be made apparent from the following detailed description of illustrative embodiments that proceeds with reference to the accompanying drawings.

BRIEF DESCRIPTION OF THE DRAWINGS

The foregoing and other aspects of the present subject matter are best understood from the following detailed description when read in connection with the accompanying drawings. For the purpose of illustrating the disclosed subject matter, there is shown in the drawings embodiments that are presently preferred, it being understood, however, that the subject matter is not limited to the specific instrumentalities disclosed. Included in the drawings are the following Figures:

FIG. 4A through FIG. 4F are views of an exemplary cross conveyance system, illustrating different unload states for use with embodiments described herein. FIG. 4A, FIG. 4C, and FIG. 4E are rear views of an exemplary cross conveyance assembly. FIG. 4B, FIG. 4D, and FIG. 4F are top views of an exemplary cross conveyance assembly.

DETAILED DESCRIPTION OF ILLUSTRATED EMBODIMENTS

Figure 1:
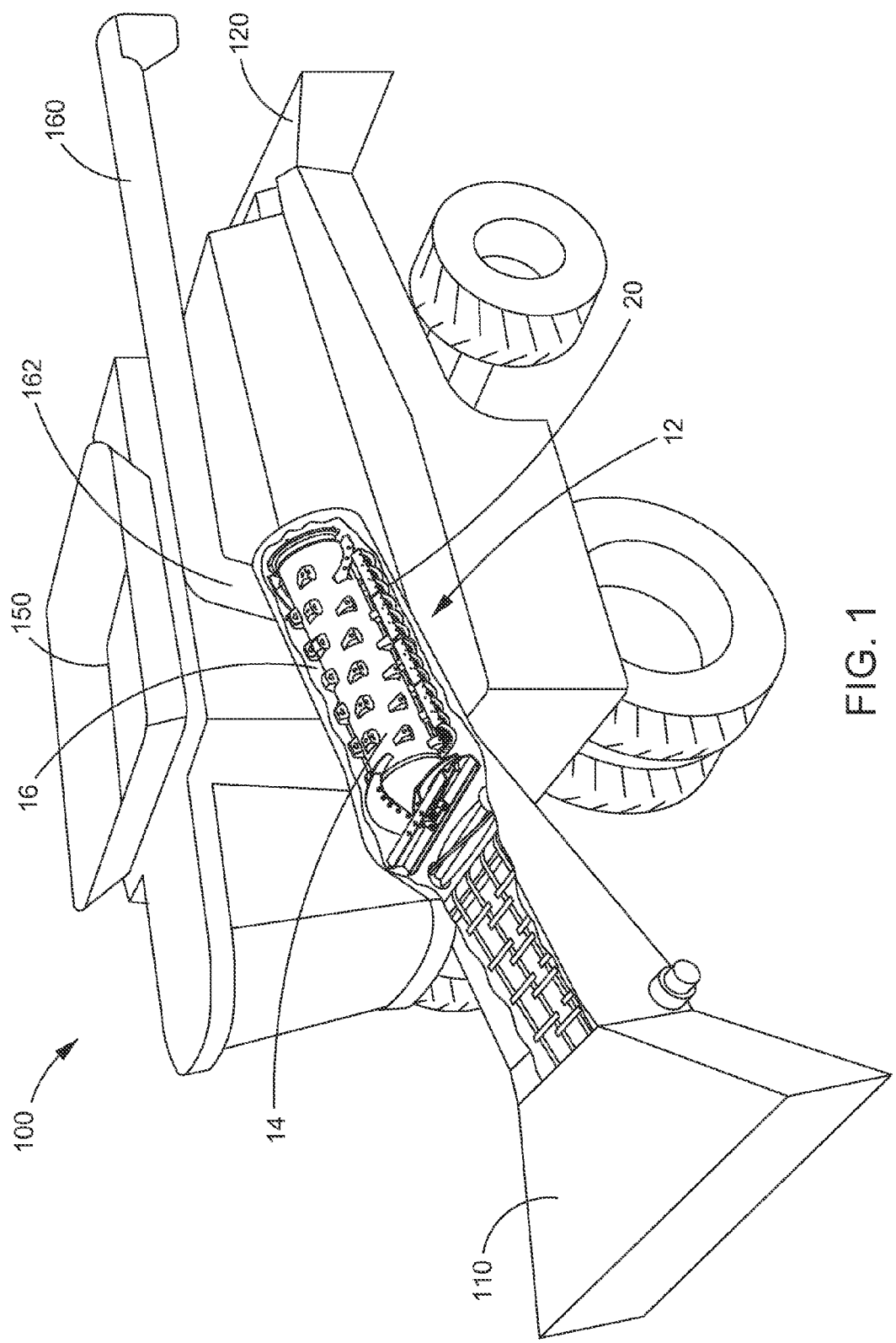
FIG. 1 illustrates a perspective view of an exemplary combine for use with embodiments described herein.

In both the conventional single drive systems and conventional dual drive systems, the operator vertically positions an auger cover or tent relative to a corresponding unloading cross auger, thereby providing a vertical opening for the grain to pass through and be fed into the cross auger. The size (e.g., height) of the opening may only be changed manually in the grain tank when the grain tank contains little or no grain. That is, the unload rate may only be manually regulated by an operator when the grain tank contains little or no grain. When these conventional unloading systems are turned off, however, the grain tanks may still include significant portions of grain. Accordingly, a torque demand spike may exist on the drive system of the augers when augers are started from rest against a large inertial load, resulting in shear bolt failures.

System structural stress may also occur when the weight of the grain makes the unload conveying auger heavier during the traversing of rough terrain. Grain dribble may occur at the discharge end of the unload conveying auger when the unload conveying auger is substantially full. Further, because of the non-optimal size of the orifice that the grain drains through as it exits the grain tank, some grains tend to be non-free flowing, resulting in bridged grain which needs to be manually removed.

Embodiments described herein are directed to a control system for a combine clean grain unload system and a method for controlling a combine unload rate. Embodiments described herein provide multiple auger covers each having cutouts that provide common openings that change in size when the auger covers move relative to each other. Embodiments utilize the common openings that change in size to provide changeable pathways for the grain to pass to augers and be unloaded from the grain tank. Embodiments described herein utilize the common openings that change in size to control the rates of grain unloaded from the grain tank. Embodiments described herein utilize sensors for sensing conditions (e.g., engine load, amount of available engine power, grain collection rate via yield monitor of the combine) and a controller for automatically controlling the auger covers to move relative to each other based on the sensed conditions to provide the additional openings for additional for grain to pass through and flow into the auger. In some embodiments, Global Positioning Satellite may be utilized to determine coordinate relative to an end of a pass to determine whether the tank is empty at the end of the pass.

Embodiments described herein provide more efficient unloading capabilities while maintaining low drive line start up torque regardless of amounts of grain in the system upon start up. Embodiments also provide slower unload rates to efficiently manage specific unloading scenarios (e.g., topping off a truck or cart). Embodiments described herein may conserve horse power in harvesting conditions where a high capacity unload is not needed. Embodiments described herein provide variable unload rate and torque management without the cost and complexity of a dual or two stage drive or variable speed drive.

Embodiments described herein provide a more efficient system by allowing a combine operator to manually adjust (e.g., via a handle, lever, or other device on the grain tank) an unload rate when the grain tank is full or substantially full, rather than adjusting the unload rate when the grain tank is empty or substantially empty.

FIG. 1 through FIGS. 3A and 3B show exemplary agricultural combines in which exemplary embodiments described herein may be implemented. FIG. 1 shows an exemplary agricultural combine 100, which may also be referred as a combine or harvester throughout this specification. As shown in FIG. 1, the combine 100 can include header 110, a longitudinally axially arranged threshing and separation system 12, and a concave 20 within the threshing and separation system 12. The threshing mechanism may also be of any well known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concave 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG such as, for example, husks, cobs, pods, and the like, and the separated materials may be carried away from the threshing and separation system 12 in a well known conventional manner. Crop residue can be redistributed to the field via a spreader 120, located at, for example, the back of the harvester.

Figure 2:
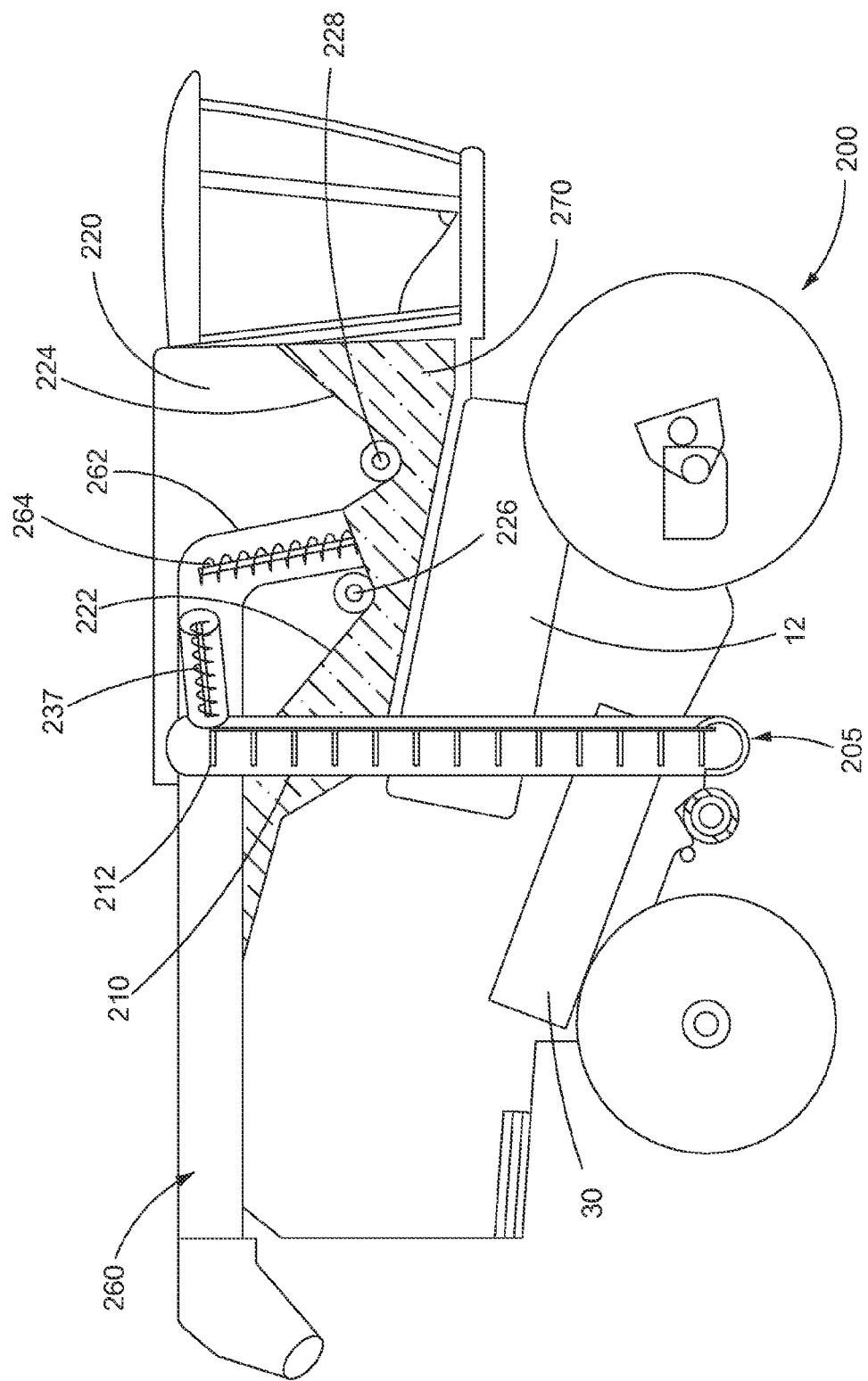
FIG. 2 illustrates a side view of an exemplary combine for use with embodiments described herein.
Figure 3A:
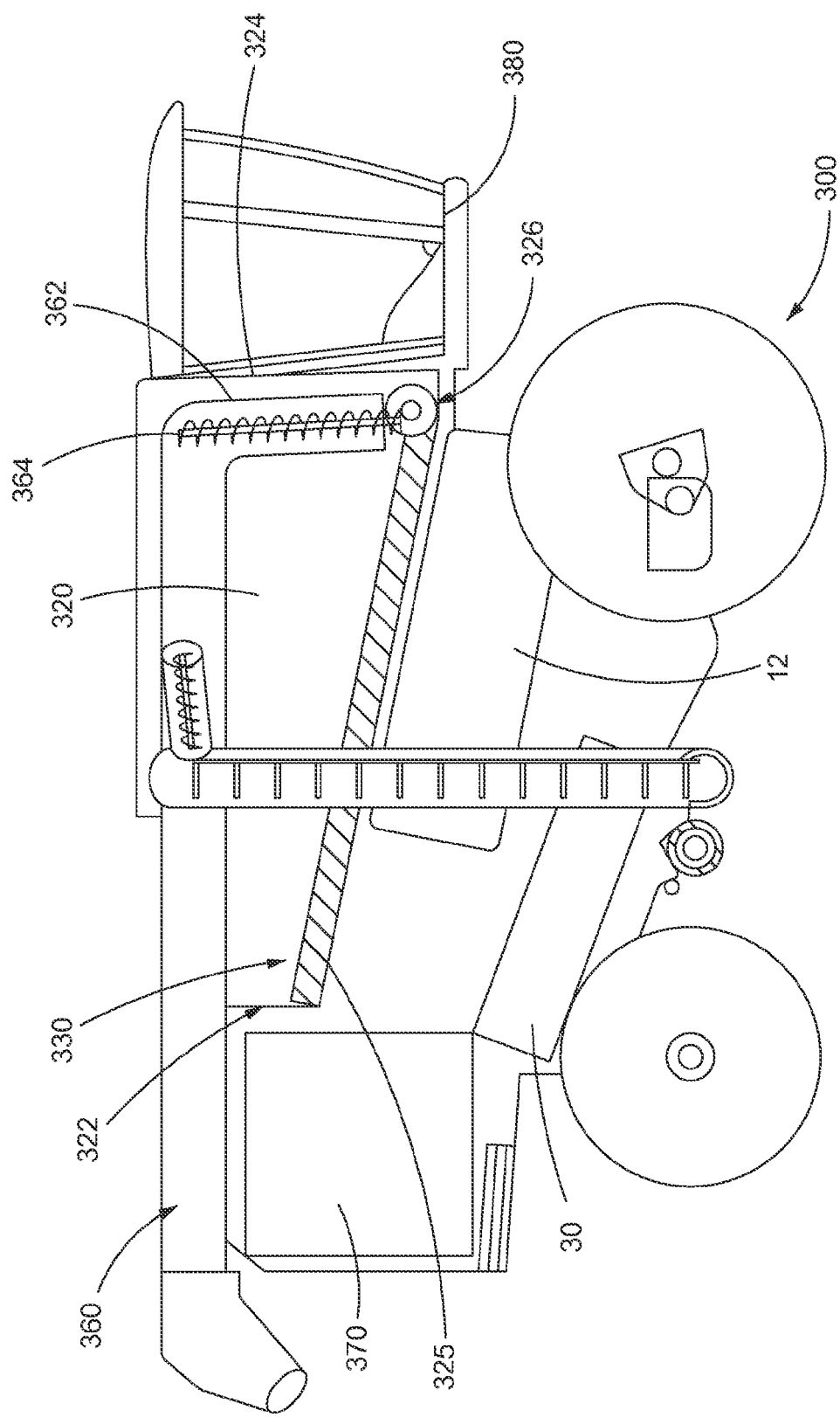
FIGS. 3A and 3B illustrate a side view of another exemplary combine for use with embodiments described herein.

The remaining threshed crop, which includes the grain to be collected, is then cleaned via a cleaning system shown at FIG. 1, FIG. 2 and FIG. 3A. The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160 representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 are replaced by an unload conveying auger that is attached to the one or more cross augers conveying grain from the cleaning system and may pivot from side to side from the combine 100, conveying grain from the combine 100.

FIG. 2 shows a transparent cross-sectional view of an exemplary agricultural combine 200 including a grain tank 220 with multiple cross augers 226 and 228 which may be used with embodiments described herein. Crop is threshed via threshing system 12. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210 which includes a paddle chain lift 212. The paddle chain lift 212, wherein the paddles are uniformly spaced along the chain to lift grain, conveys the grain upward to a dispenser auger 237 that discharges the grain into the grain tank 220. In other arrangements, the grain is lifted from the paddle chain lift 212 and then flipped at the top of the elevator to a sump (not shown), containing a bubble-up auger (not shown). The bubble-up auger transports grain from the sides of the grain tank 220 to the top center of the tank where the grain is discharged in the center of the tank 220 to naturally form a cone-shape pile, wherein the angles of the sides of the cone equal the angle of repose of the grain. Other arrangements implement other auger assemblies to either distribute the grain evenly along the bottom of the grain tank 220 or centrally in the middle of the grain tank 220. In this arrangement of grain tank 220, sloping side walls 222 and 224 are sloped such that as grain accumulates in the grain tank 220 as conveyed from dispenser auger 237, the grain naturally slides down to cross augers 226 and 228. These side walls 222 and 224 are sloped at such an angle that they convene at the bottom of the tank 220 to form the 'W' shape floor bottom, as shown. Grain tank cross augers 226 and 228 convey the accumulated grain laterally so that it may be collected into vertical tube 262 which includes a unload conveying vertical auger 264 that propels the grain upward. This allows grain to be moved into an unload vehicle via unload tube 260, which may include another unload conveying internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

FIG. 3A shows a transparent cross-sectional view of another exemplary agricultural combine 300 with a single grain tank cross auger 326 which may be used. As shown in FIG. 3A, combine 300 may include an engine 370, cab 380 and a grain tank 320. Grain tank 320 includes vertical side walls 322 and 324 and generally flat bottom 325. Along the bottom 325 of grain tank 320, a conveyance system 330 is placed. Bottom 325 includes an active conveying system 330 such that grain tank 320 need not rely on gravity to feed grain into the cross auger. Conveyance system 330, in some embodiments, conveys collected grain forward in the grain tank 320 to a single grain tank cross auger 326. Cross auger 326 then conveys the grain laterally to be collected by vertical tube 362, which includes a vertical unload conveying auger 364 to propel the grain upward. This sends grain into an unload tube 360, which may include another unload conveying auger (not shown).

Figure 3B:
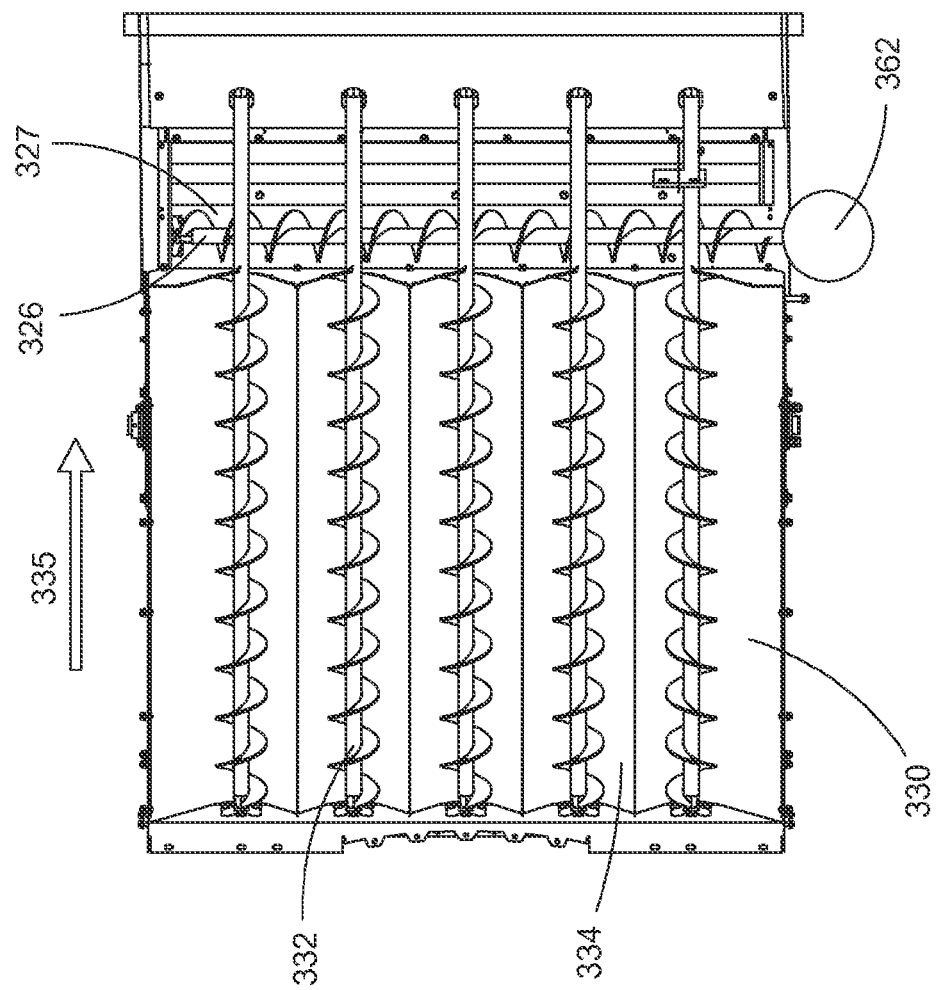

FIG. 3B is a top view of the exemplary conveyance system 330, shown at FIG. 3A, in which exemplary embodiments described herein may be implemented. This embodiment of conveyance system 330 comprises an auger bed. Grain tank augers 332 sit in troughs 334 and rotate to convey grain in direction 335. When grain reaches grain tank cross auger 326, grain tank cross auger 326 conveys the grain in a transverse direction so that it may be conveyed to a vertical tube 362. As shown, grain tank cross auger 326 rests in trough 327.

In some embodiments described herein, some grain tank augers 332 in auger bed rotate in one direction, while other augers rotate in another. In some embodiments, some of the grain tank augers 332 in the auger bed may rotate more or less rapidly than other augers 332 in the auger bed. In other embodiments, some grain tank augers 332 vary in size, pitch, or diameter from other grain tank augers 332 in the auger bed. In other embodiments, some grain tank augers 332 may rotate while other augers are turned off.

Traditionally, grain is conveyed in direction 335, left to right which is from the rear of the combine to the front of the combine. In some embodiments, the grain may be conveyed in a right to left direction. In other embodiments, grain may be conveyed from an outside to center direction, if for instance the grain tank cross auger 326 and vertical tube 362 were more centrally located in the conveyance system 330 or depending on other design considerations in locating the grain tank cross auger 326 and vertical tube 362. Location of the grain tank cross auger 326 or vertical tube 362 may necessitate the location of grain tank augers 332 in the auger bed, the on and off sequencing of the grain tank augers 332, and/or the rotational speed, size, pitch, or diameter of the grain tank augers 332 to effectuate conveyance of grain through the conveyance system 330. Augers 332 and 326 may be driven by a conventional manner known to a person of ordinary skill or, such as motors, gears, belts, chains, direct mechanical drives, and the like.

Figure 4A:
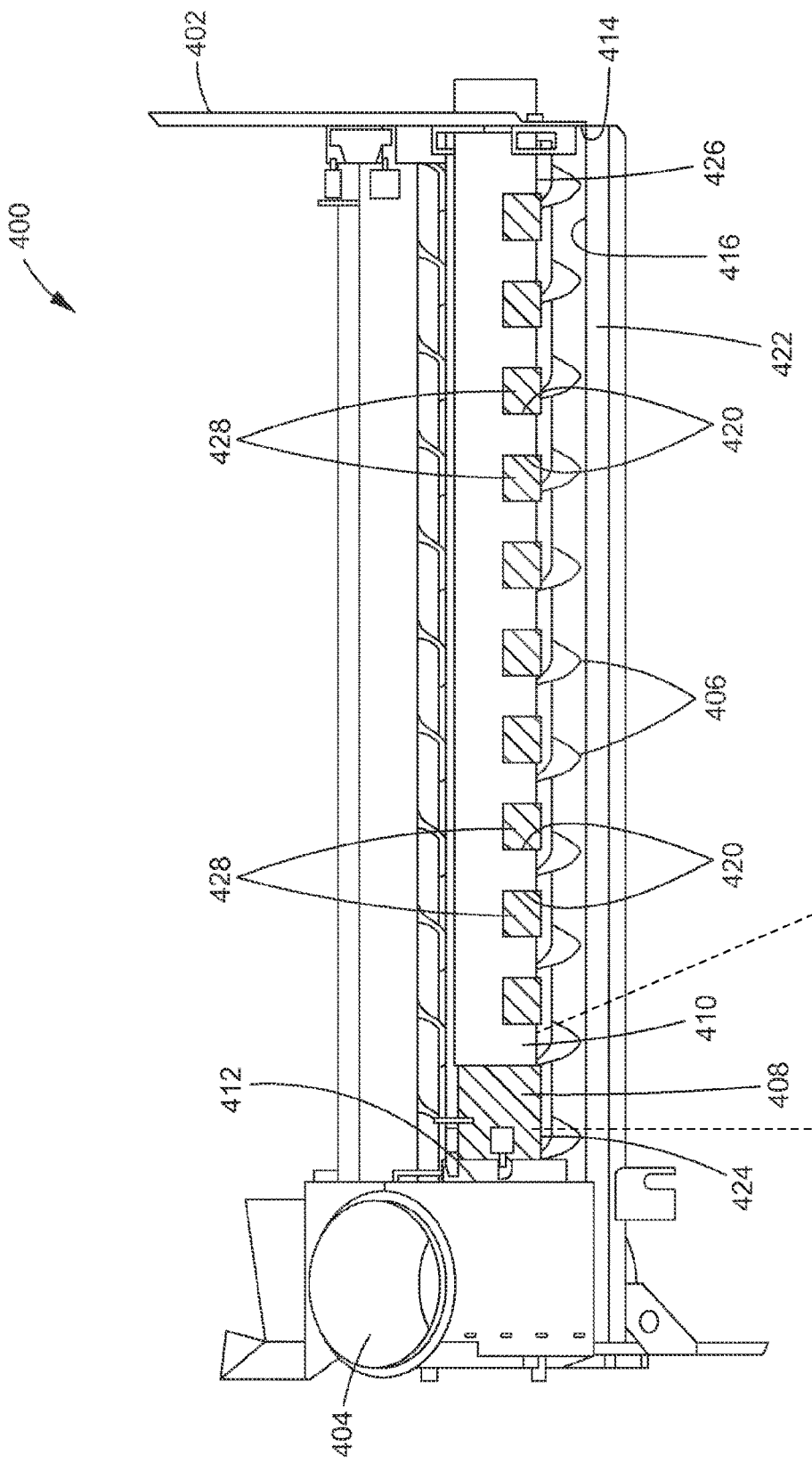
Figure 4B:
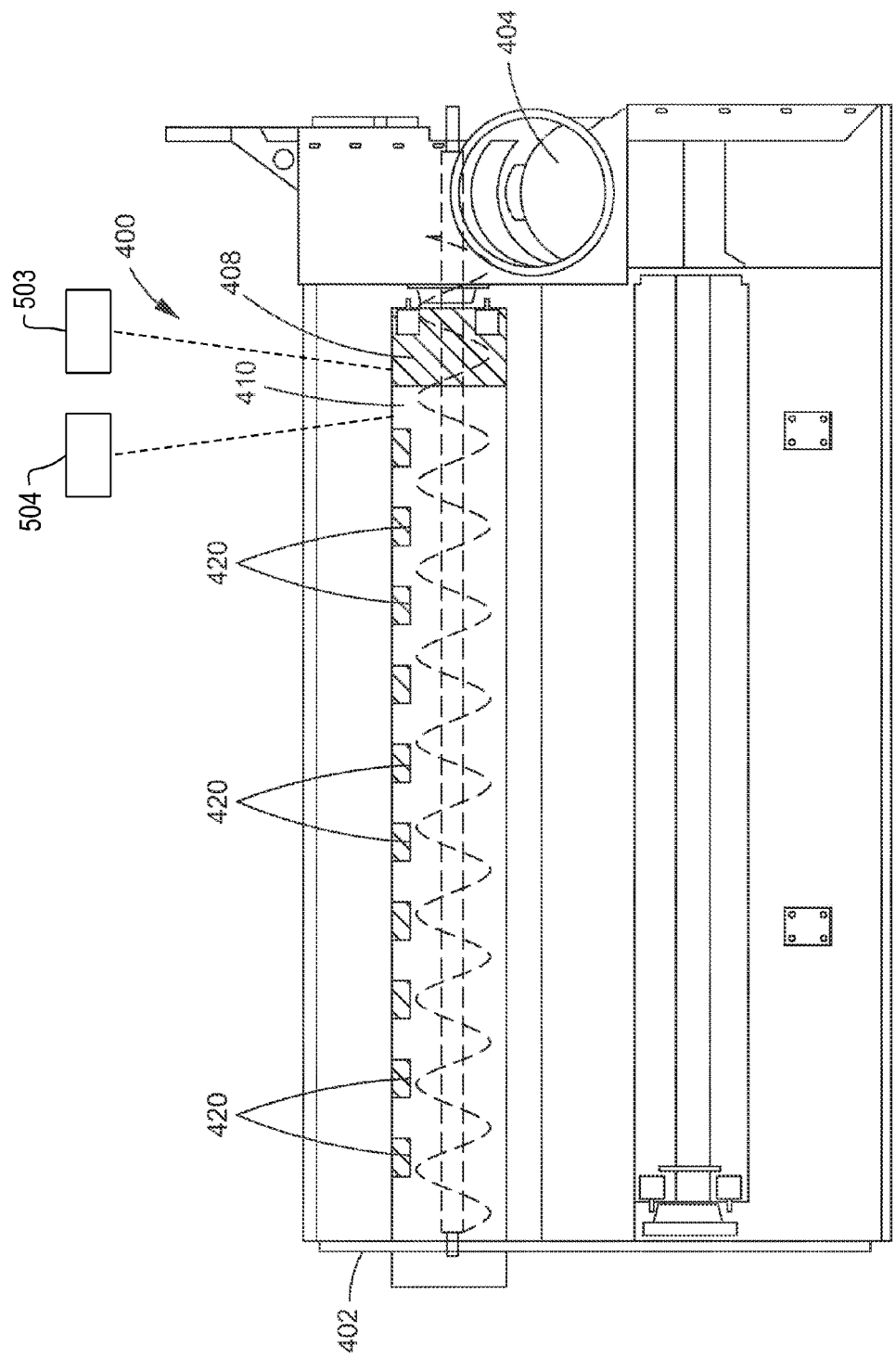
Figure 4D:
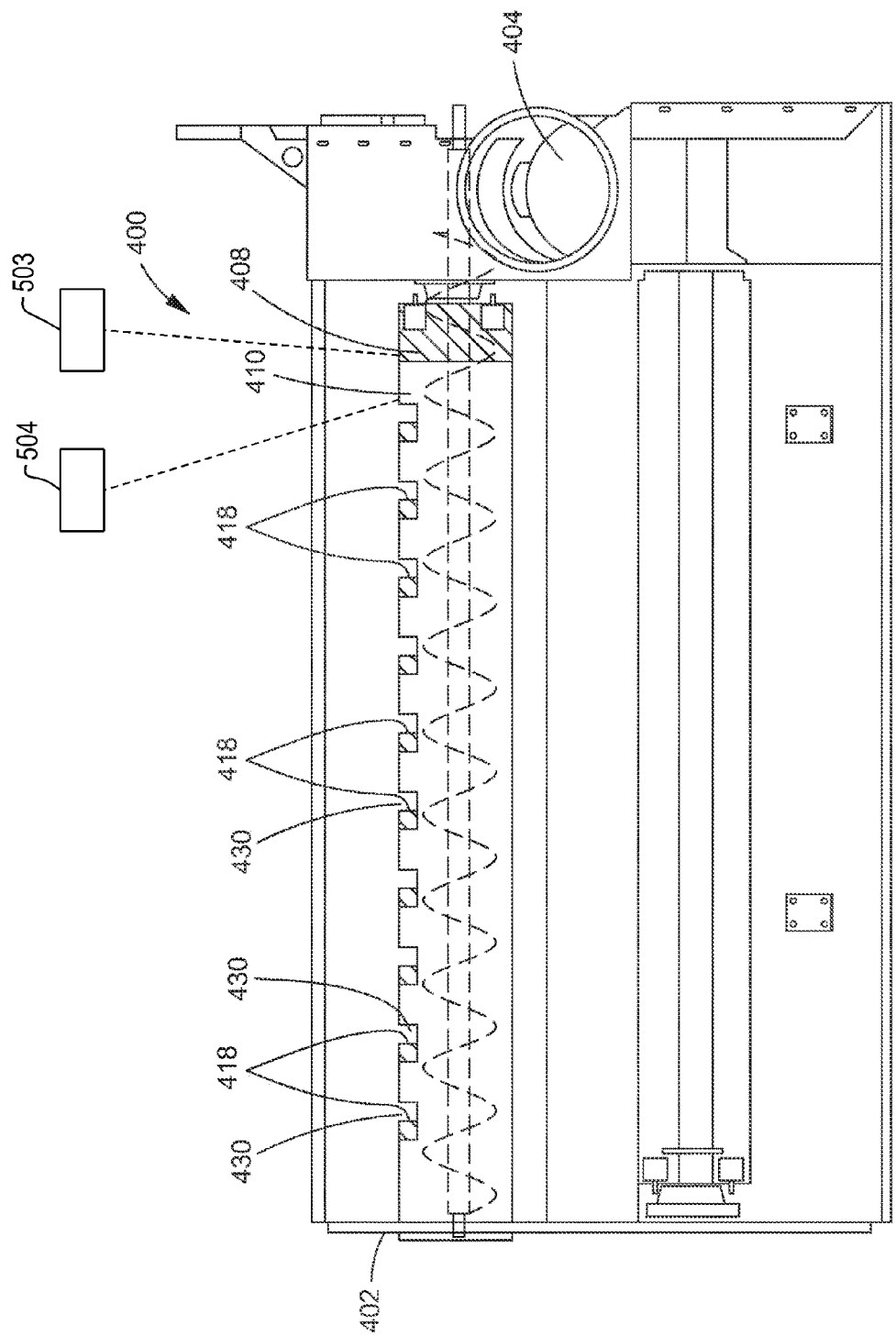
Figure 4E:
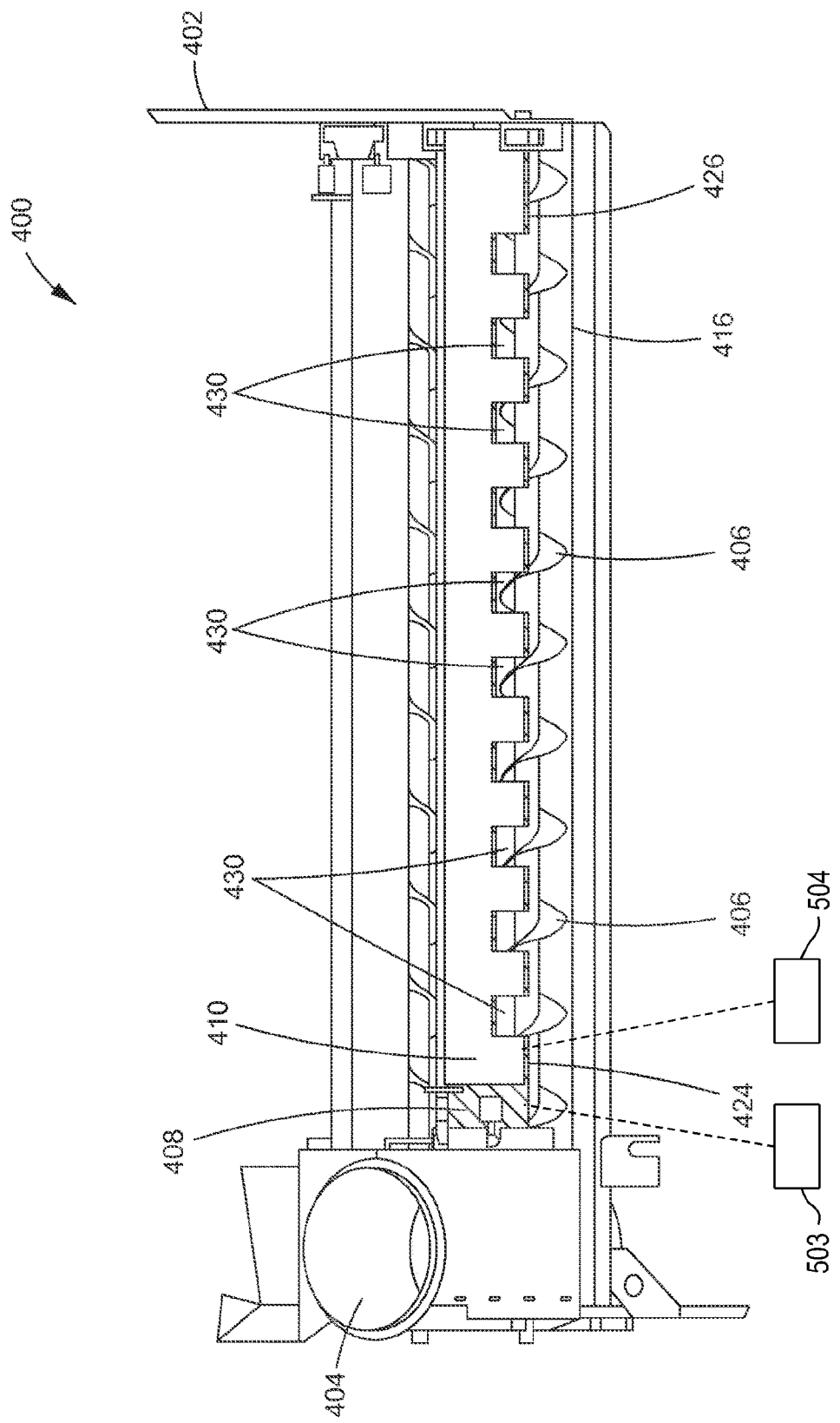
Figure 4F:
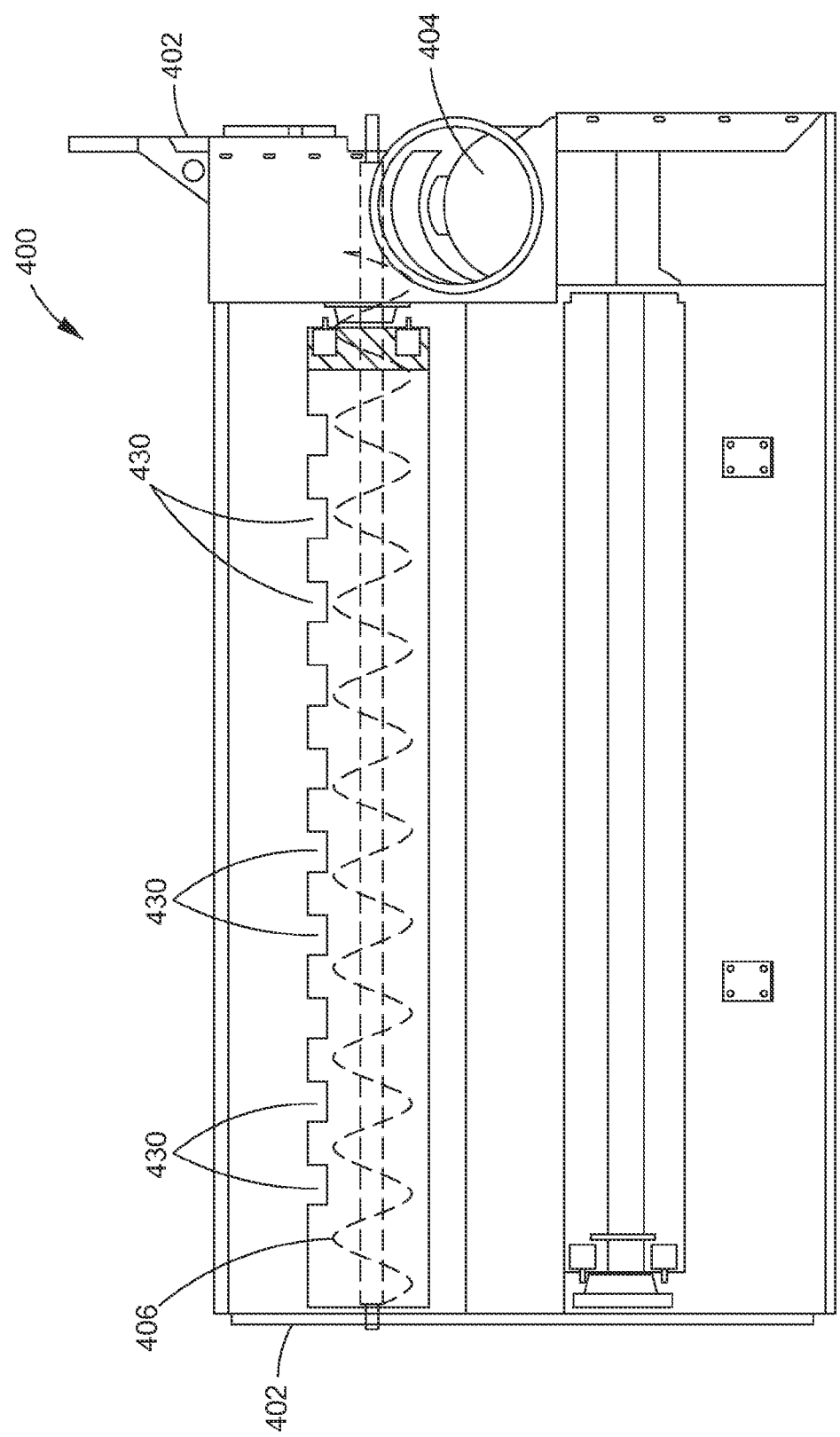

FIG. 4A through FIG. 4F of are views of an exemplary cross conveyance system 400 of a combine unload system, illustrating different unload states of system 400 in which exemplary embodiments described herein may be implemented. FIG. 4A, FIG. 4C, and FIG. 4E are rear views of the exemplary cross conveyance assembly 400. FIG. 4B, FIG. 4D, and FIG. 4F are top views of the exemplary cross conveyance assembly 400.

Figure 5:
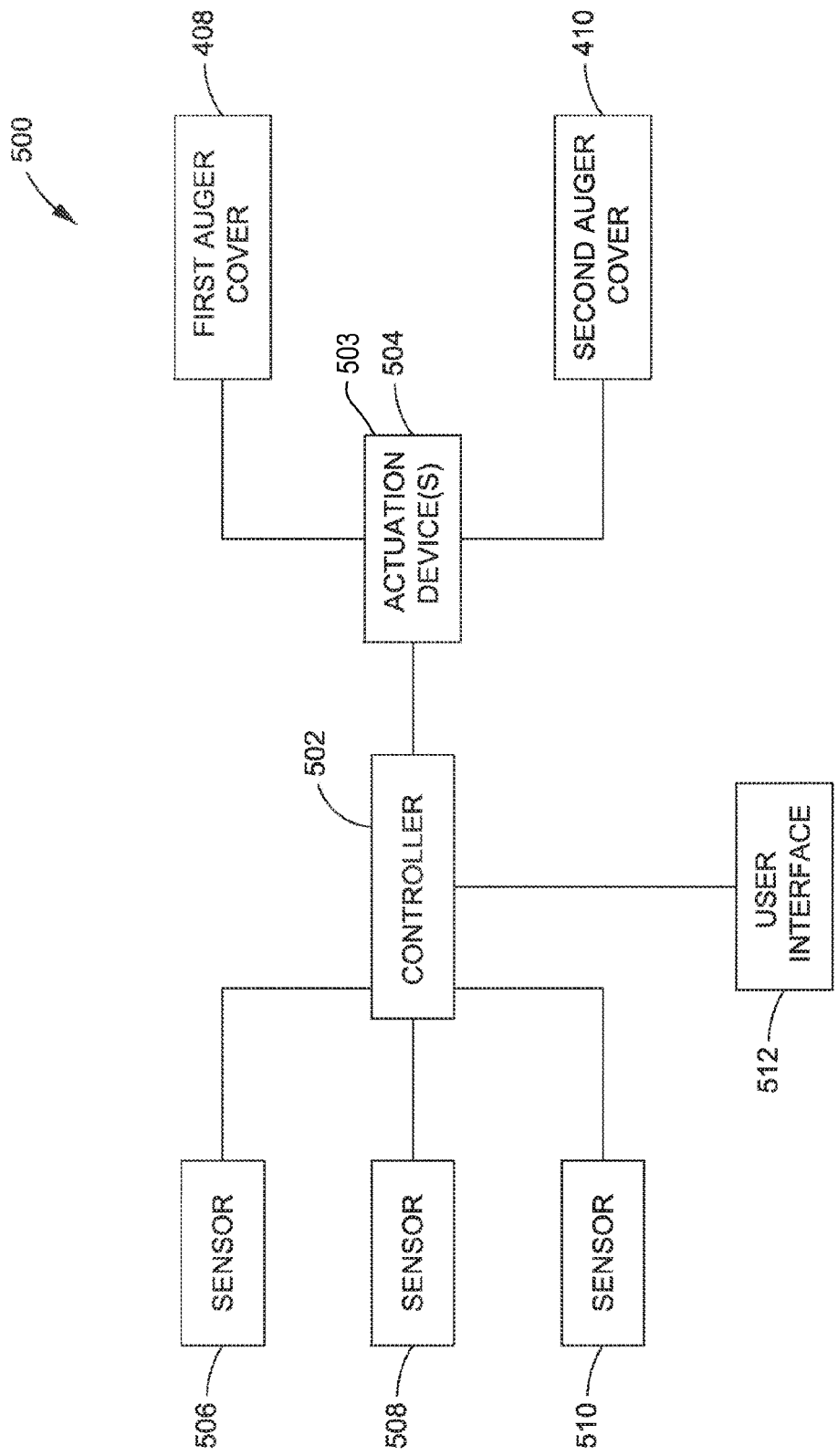
FIG. 5 is a block diagram illustrating an exemplary combine unload control system for an unload system for use with embodiments described herein.

As shown in FIG. 4A, the cross conveyance system 400 may include cross auger 406, extending between first end 412 and second end 414 of grain tank 402, for unloading grain from the grain tank 402 via unload tube 404 to a grain cart, such as grain cart 510 shown in FIG. 5. Cross conveyance assembly 400 may also include a first auger cover 408 proximate to the auger 406 and a second auger cover 410 proximate to the auger 406. As shown in FIG. 4A, the first auger cover 408 may be located between auger 406 and the second auger cover 410. First auger cover 408 may include first auger cutouts 418 (partially shown in FIG. 4C) disposed on a portion of the first auger cover 408. Second auger cover 410 may include second auger cutouts 420 (shown in FIG. 4A) disposed on a portion of the second auger cover 410. Embodiments may include any number of cross augers and any number of auger covers located proximate to the cross augers.

The number and geometry of the first auger cutouts 418 and the second auger cutouts 420 shown in the embodiments at FIG. 4A through FIG. 4F are exemplary. Embodiments may include auger covers having any number of auger cutouts. Embodiments may also include auger cutouts having different geometries (circular, triangular than the auger cutouts shown in FIG. 4A through FIG. 4F. In some embodiments, the geometries of first auger cutouts on the first auger may be the same as the geometries of the second auger cutouts on the first auger. In other embodiments, the geometries of one or more first auger cutouts may be different than the geometries of one or more second auger cutouts. Spacing between the auger cutouts may be uniform or non-uniform.

The conveyance system 400 may include a vertical opening 422 extending between ends 424, 426 of the first and second auger covers 408, 410 and auger bed 416 to provide a pathway for the grain to pass through and flow to auger 406. The first auger cover 408 and the second auger cover 410 may be configured to move relative to each other and cause different amounts of grain to pass through the first auger cutouts 418 and the second auger cutouts 420 and flow to the at least one auger 406. For example, as shown in FIG. 4A and FIG. 4B, first auger cover 408 and second auger cover 410 are in positions such that second auger cutouts 420 are overlaid upon non-cutout portions 428 of the first auger cover 408. In the unload state shown at FIG. 4A and FIG. 4B, grain may flow through the vertical opening 422 to auger 406 but does not pass through first auger cutouts 418 and second auger cutouts 420.

As shown in the embodiments at FIG. 4A through 4F, cutouts 420 may be disposed on the rear facing edge of the second auger cover 410. Embodiments may include, however, cutouts disposed on any surface/and/or edge of auger covers.

In FIG. 4C and FIG. 4D, second auger cover 410 has moved horizontally while first auger cover 408 has remained stationary. In the unload state shown at FIG. 4C and FIG. 4D, first auger cover 408 and second auger cover 410 are in positions such that portions of second auger cutouts 420 are overlaid upon portions of first auger cutouts 418, thereby providing common openings 430 that are approximately 50% the size of the first auger cutouts 418 and the size of the second auger cutouts 420. In the unload state shown at FIG. 4B and FIG. 4C, grain may pass through common openings 430 in addition to the vertical opening 422 to auger 406. Accordingly, common openings 430 increase the size of the pathway for the grain to pass through and flow to auger 406, thereby increasing the amount of grain being unloaded from the grain tank 402.

In FIG. 4D and FIG. 4E, second auger cover 410 has moved further horizontally while first auger cover 408 has remained stationary. In the unload state shown at FIG. 4D and FIG. 4E, first auger cover 408 and second auger cover 410 are in positions such that second auger cutouts 420 are overlaid upon first auger cutouts 418, thereby providing common openings 430 that are approximately equal to the size of the first auger cutouts 418 and the size of the second auger cutouts 420. Accordingly, in the unload state shown at FIG. 4D and FIG. 4E, common openings 430 further increase the size of the pathway for the grain to pass through and flow to auger 406, thereby further increasing the amount of grain being unloaded from the grain tank 402.

In the embodiments shown at FIG. 4A through FIG. 4E, first auger cover 408 and second auger cover 410 are moved relative to each other by moving second auger cover 410 while first auger cover 408 remains stationary. Embodiments may include, however, moving first auger cover 408 and second auger cover 410 relative to each other by moving first auger cover 418 while second auger cover 420 remains stationary. Other embodiments may include moving first auger cover 408 and second auger cover 410 relative to each other by moving both first auger cover 418 and second auger cover 420. In the embodiments shown at FIG. 4A through FIG. 4F, first auger cover 408 and second auger cover 410 are moved between three states. Embodiments may include moving auger covers between any number of states, however, to provide different amounts of grain to pass through any number of different sized common openings and be unloaded from the grain tank 402.

In the embodiments shown at FIG. 4A through FIG. 4E, first auger cutouts 418 and second auger cutouts 420 are disposed adjacent the ends 426 and 428 of the first and second auger covers 408, 410 such that the common openings 430 are configured to increase the size of the pathway for the grain to pass through and flow to the auger 406. Embodiments may, however, include cutouts on any portion of auger covers to provide common openings on any portion of auger covers.

In some embodiments, the first auger cover and the second auger cover may be configured to automatically move relative to each other based on sensed combine conditions. For example, as shown at FIG. 5, a control system 500 may include first auger cover 408 and the second auger cover 410 and a controller 502. Controller 502 may be configured to control amounts of grain to pass through first auger cutouts 418 and second auger cutouts 420 and flow to the auger 406 by causing the first auger cover 408 and the second auger cover 410 to move relative to each other. As shown in FIG. 5, and FIGS. 4A, 4B, 4C, 4D and 4E, the control system 500 may also include a first auger cover actuation device 503 and a second auger cover actuation device 504 both shown in schematic form. In other embodiments, a single actuation device may be used to move multiple auger covers. In some embodiments, control systems may include a single actuation device to move a single auger cover while the other auger cover remains stationary. Control systems may include any number of actuation devices to move any number of auger covers. Control systems may include any type of actuation device configured to move auger covers relative to each other, such as actuators (e.g., linear actuator), worm screws, motors (e.g., electric motor) and hydraulic cylinders.

Some embodiments may include non-friction or low friction elements between auger covers (e.g., between a movable cover and a stationary cover) to provide low and consistent actuation force requirements.

As shown in FIG. 5, the control system 500 may also include combine condition sensors 506, 508, and 510. It is contemplated that any number of sensors may be used to sense combine conditions. Sensors 506, 508, and 510 may be configured to sense operating conditions of a combine system. Controller 502 may automatically control amounts of grain to pass through the one or more first auger cutouts and the one or more second auger cutouts based on the sensed conditions. For example, based on the sensed conditions from one or more of sensors 506, 508, and 510, controller may cause first auger cover 408 and the second auger cover 410 to move to any of the positions shown in FIG. 4A through FIG. 4F.

Controller 502 may cause auger covers 408 and 410 to move relative to each other based on horsepower demand in the unload system and other combine systems. During harvesting, considerable amounts of power are consumed to perform different activities, such as harvesting, unloading grain into a grain cart and moving the combine on the ground. Accordingly, different combine systems demand horsepower for their respective functions. The demand may depend on many factors. For example, the unload system may demand less horsepower for a grain that flows easier than a grain that does not flow as easy.

Unload rates may be controlled based on the amount of horsepower available to the unload system. Ground speed horsepower demand may vary depending on ground conditions (e.g., hilly terrain vs. flat terrain, muddy conditions vs. dry conditions). Combines may be in states where the combine is unloading without moving, thereby creating an increased horsepower demand in the unload system without a high demand for ground speed. Combines may be in states where the combine is moving through the field and unloading without harvesting, thereby creating an increased horsepower demand in the unload system without a high demand for harvesting. Accordingly, auger covers 408 and 410 may be moved relative to each other to reduce the unload rate (e.g., states shown at FIG. 4A through FIG. 4D) to conserve horse power during harvesting conditions where a high capacity unload is not needed and increase the unload rate (e.g., state shown at FIG. 4E and FIG. 4F) to increase horse power during harvesting conditions where a high capacity unload is needed.

In some embodiments, controller 502 may cause auger covers 408 and 410 to move relative to each other based on sensed combine conditions indicating more precise unloading scenarios, such as topping off a truck or cart. During these more precise unloading scenarios, auger covers 408 and 410 may be moved relative to each other to reduce the unload rate (e.g., state shown at FIG. 4C and FIG. 4D).

According to other embodiments, controller 502 may cause auger covers 408 and 410 to move and increase the unload rate (e.g., state shown at FIG. 4E and FIG. 4F) based on the need for greater unloading capabilities while maintaining low drive line start up torque regardless of how much grain is in the system upon start up.

Due to the scenarios above, sensors may be utilized to sense conditions of the unload system and of one or more additional combine systems, to determine whether to increase or decrease the unload rates by causing auger covers 408 and 410 may be moved relative to each other.

Accordingly, sensors 506, 508, and 510 may include sensors for sensing combine unload conditions, such as a condition of the unload drive system (e.g., a force on one or more grain tank augers), a combine engine torque condition, a grain cart level condition, a combine grain tank level condition, an unload conveyer location condition, a grain cart location condition, an unload drive system operation condition, and a grain cart weight and duration condition.

Sensors 506, 508, and 510 may include other types of sensors for sensing different combine system conditions, such as: a separator system engaging sensor for sensing if a separator system is engaged; a feeder system engaging sensor for sensing if the feeder system is engaged; an operational system speed sensors for sensing respective operational speeds of at least one of a combine engine, a combine drive system, the combine feeder system, a combine crop-handling system, a combine threshing system, a combine cleaning system and a combine residue system; crop flow sensors for sensing respective crop rates moving through at least one of the combine feeder system, the combine crop-handling system, the combine threshing system, the combine cleaning system and the combine residue system; and a feeder system position sensor for sensing a position of a feeder mechanism relative to a portion of a combine frame.

In some embodiments, controller 502 may cause auger covers 408 and 410 to move if the sensed combine conditions exceed predetermined thresholds. Control systems may include comparators (not shown) for comparing the sensed combine conditions to predetermined force thresholds.

Embodiments may include sensing combine operating condition that include whether a unload condition (e.g., force on the unload drive system) has reached a predetermined unload threshold value. Embodiments may include sensing combine operating condition that include whether the combine separator system is activated. The combine separator system may include the combine feeder system, the combine crop-handling system, the combine threshing system, the combine cleaning system and the combine residue system.

Embodiments may also include sensing combine operating condition that include: whether the feeder system is activated independent from the separator system; whether an operational system speed has reached a predetermined speed threshold value in at least one of the combine drive system, the combine feeder system, the combine crop-handling system, the combine threshing system, the combine cleaning system and the combine residue system; whether an operational system speed of a combine system has reached a predetermined speed threshold value for a predetermined amount of time in at least one of the combine feeder system, the combine crop-handling system, the combine threshing system, the combine cleaning system and the combine residue system; whether a rate of crop flow has reached a predetermined threshold value in at least one of the combine feeder system, the combine crop-handling system, the combine threshing system, the combine cleaning system and the combine residue system; and whether a position of a feeder mechanism of the combine feeder system has reached a predetermined threshold position, wherein the position of the feeder mechanism includes an angle of the feeder mechanism relative to a combine frame.

Controller 502 may cause auger covers 408 and 410 to move relative to each other based on other combine conditions, such as a combine engine torque condition, a grain cart level condition, a combine grain tank level condition, an unload conveyer location condition, a grain cart location condition, an unload drive system operation condition, and a grain cart weight and duration condition. For example, auger covers 408 and 410 may be moved based on: whether the engine torque is above a predetermined threshold; whether a bin level in a grain cart has reached a predetermined threshold (e.g., grain cart is full); whether a combine grain tank (or bin) level has reached a predetermined threshold; whether an unloading tube has swung out or moved to a predetermined position; whether a grain cart is in an unloading position or moved to a predetermined position; a grain cart weight and duration condition, such as whether the grain cart weight has reached a predetermined threshold for a predetermined time period; whether unloading of grain is still in progress; whether a manual override has been initiated; and whether the unload system is in a cleanout mode.

In some embodiments, an operator may manually control the movement of the first auger cover and the second auger cover relative to each other. For example, control system 500 may include a user interface 512. Controller 502 may be configured to receive an input via the user interface 512 and control the first auger cover 408 and the second auger cover 410 to move relative to each other responsive to the received input. User interface 512 may include a display indicating one of the sensed conditions from sensors 506, 508, and 510 to an operator. The operator may view (or listen) the sensed condition and cause the first auger cover 408 and the second auger cover 410 to move relative to each other based on the indicated sensed condition.

Some embodiments may include GPS based unload rate control. For example, GPS enabled auto-guidance/yield mapping software may be utilized to accurately determine (e.g., within feet) when a vehicle is completing a pass of uncut crop and will be entering an area where the crop is already harvested. In some aspects, if the grain cart is not able to get to the combine with enough time left in a harvesting pass to fully unload the combine while moving, both the combine and the grain cart may need to sit still while the unloading process is completed in order to provide the combine grain tank with enough free space so that the machine can run continuously until the grain cart can unload and return. Stationary unloading may result in significant loss in efficiency and overall harvesting capacity and can sometimes lead to spilled or lost grain due to miscommunication of the stopping point between the grain cart and combine operator. The grain tank of the vehicle may be empty (or substantially empty) at the end of the harvesting pass without having to stop (maximize grain cart's available capacity and maximize the amount of available space in the combine's grain tank. The more space in the grain tank the greater the time remaining until the combine would need to unload). Based on the GPS coordinates, rate of speed of the vehicle, and the software's knowledge of when the harvesting pass will terminate, the unload rate may be increased to provide a more complete unload prior to the end of the pass. In some aspects, the harvesting speed may be slowed to provide a more complete unload and improve overall harvesting efficiency.

Although the subject matter has been described with reference to exemplary embodiments, it is not limited thereto. Those skilled in the art will appreciate that numerous changes and modifications may be made to the embodiments described herein and that such changes and modifications may be made without departing from their true spirit. It is therefore intended that the appended claims be construed to cover all such equivalent variations as fall within their true spirit and scope.

What is claimed is:

1. A combine having an unload control system, said combine comprising:
    a header;
    a threshing and separating system receiving crop material from said header;
    a cleaning system for receiving crop material from said threshing and separating system;
    a grain tank for storing grain;
    a conveyor for delivering grain from said cleaning system to said grain tank;
    at least one auger for unloading grain from the grain tank;
    a first auger cover proximate to the at least one auger, having one or more first auger cutouts disposed on a portion of the first auger cover;
    a second auger cover proximate to the at least one auger and having one or more second auger cutouts disposed on a portion of the second auger cover;
    one or more actuation devices connected to at least one of the first and second auger covers;
    a controller connected to said one or more actuation devices and configured to control said one or more actuation devices to allow variable amounts of grain to pass through the one or more first auger cutouts and the one or more second auger cutouts and flow to the at least one auger by causing the first auger cover and the second auger cover to move relative to each other;
    wherein a vertical opening extends between ends of the first and second auger covers and an auger bed to provide a continuous pathway for the grain to pass through and flow to the at least one auger;
    at least one sensor for sensing at least one operating condition of a combine system; and
    wherein, the controller is further configured to automatically control the amounts of grain to pass through the one or more first auger cutouts and the one or more second auger cutouts based on the sensed conditions, wherein the at least one sensor is from a group of sensors comprising:
    an unload drive system sensor for sensing a condition of the unload drive system;
    a separator system engaging sensor for sensing if a separator system is engaged;
    a feeder system engaging sensor for sensing if the feeder system is engaged;
    operational system speed sensors for sensing respective operational speeds of at least one of a combine engine, a combine drive system, the combine feeder system, a combine crop-handling system, a combine threshing system, a combine cleaning system and a combine residue system;
    crop flow sensors for sensing respective crop rates moving through at least one of the combine feeder system, the combine crop-handling system, the combine threshing system, the combine cleaning system and the combine residue system; and
    a feeder system position sensor for sensing a position of a feeder mechanism relative to a portion of a combine frame.

2. The combine of claim 1, wherein the one or more first auger cutouts and the one or more second auger cutouts are configured to provide common openings for the grain to pass through, and
    the common openings change in size when the first auger cover and the second auger cover to move relative to each other.

3. The combine of claim 1, wherein the first auger cover is positioned between the at least one auger and the second auger cover, and
    the second auger cover moves while the first auger cover remains stationary.

4. The combine of claim 1, wherein the first auger cover is positioned between the at least one auger and the second auger cover, and
    the first auger cover moves while the second auger cover remains stationary.

5. The combine of claim 1, wherein the geometries of the one or more first auger cutouts and the geometries of the one or more second auger cutouts are substantially the same.

6. The combine of claim 1, wherein the cutouts are disposed adjacent the ends of the first and second auger covers such that the common openings are configured to increase the size of the pathway for the grain to pass through.

7. The combine of claim 1, wherein the controller is further configured to (i) receive an input via a user interface to control the movement of the first auger cover and the second auger cover relative to each other; and (ii) control the first auger cover and the second auger cover to move relative to each other responsive to the received input.

8. A combine having an unload control system, said combine comprising:
    a header;

a threshing and separating system receiving crop material from said header;

a cleaning system for receiving crop material from said threshing and separating system;

a grain tank for storing grain;

a conveyor for delivering grain from said cleaning system to said grain tank;

at least one auger for unloading grain from the grain tank;

a first auger cover proximate to the at least one auger, having one or more first auger cutouts disposed on a portion of the first auger cover;

a second auger cover proximate to the at least one auger and having one or more second auger cutouts disposed on a portion of the second auger cover;

one or more actuation devices connected to at least one of the first and second auger covers;

a controller connected to said one or more actuation devices and configured to control said one or more actuation devices to allow variable amounts of grain to pass through the one or more first auger cutouts and the one or more second auger cutouts and flow to the at least one auger by causing the first auger cover and the second auger cover to move relative to each other; and, wherein a vertical opening extends between ends of the first and second auger covers and an auger bed to provide a continuous pathway for the grain to pass through and flow to the at least one auger;

at least one sensor for sensing at least one operating condition of a combine system, and wherein, the controller is further configured to automatically control the amounts of grain to pass through the one or more first auger cutouts and the one or more second auger cutouts based on the sensed conditions, wherein the at least one operating condition sensed by the at least one sensor is from a group of operating conditions comprising:

whether a force on the unload drive system has reached a predetermined force threshold value;

whether the combine separator system is activated, the combine separator system comprising at least one of the combine feeder system, the combine crop-handling system, the combine threshing system, the combine cleaning system and the combine residue system;

whether the feeder system is activated independent from the separator system;

whether an operational system speed has reached a predetermined speed threshold value in at least one of the combine drive system, the combine feeder system, the combine crop-handling system, the combine threshing system, the combine cleaning system and the combine residue system;

whether an operational system speed of a combine system has reached a predetermined speed threshold value for a predetermined amount of time in at least one of the combine feeder system, the combine crop-handling system, the combine threshing system, the combine cleaning system and the combine residue system;

whether a rate of crop flow has reached a predetermined threshold value in at least one of the combine feeder system, the combine crop-handling system, the combine threshing system, the combine cleaning system and the combine residue system; and whether a position of a feeder mechanism of the combine feeder system has reached a predetermined threshold position, wherein the position of the feeder mechanism includes an angle of the feeder mechanism relative to a combine frame.

\* \* \* \* \*